United States Patent [19]
Denda et al.

[11] Patent Number: 5,967,164
[45] Date of Patent: Oct. 19, 1999

[54] VALVE WITH A LAVAL NOZZLE AND A METHOD OF METERING A FLUID

[75] Inventors: Michael Denda, Senden; Wolfram Fleck, Erbach; Jochen Sang, Stuttgart, all of Germany

[73] Assignee: DaimlerChrysler AG, Stuttgart, Germany

[21] Appl. No.: 08/954,101

[22] Filed: Oct. 20, 1997

[30] Foreign Application Priority Data

Oct. 18, 1996 [DE] Germany .............................. 196 43 054

[51] Int. Cl.⁶ ................................................... F16K 47/00
[52] U.S. Cl. ................................ 137/1; 251/121; 251/903
[58] Field of Search .................................... 251/121, 122, 251/903, 120; 137/1

[56] References Cited

U.S. PATENT DOCUMENTS

| | | |
|---|---|---|
| 1,698,826 | 9/1929 | Shaffer . |
| 4,413,646 | 11/1983 | Platt et al. . |
| 5,368,273 | 11/1994 | Dante . |
| 5,515,674 | 5/1996 | Kaufmann et al. . |

FOREIGN PATENT DOCUMENTS

| | | |
|---|---|---|
| 668431 | 11/1929 | France . |
| 34 44 039 | 6/1986 | Germany . |
| 36 26 681 | 1/1988 | Germany . |
| 41 00 086 | 7/1991 | Germany . |
| 42 33 207 | 4/1994 | Germany . |

*Primary Examiner*—Kevin Lee
*Attorney, Agent, or Firm*—Evenson, McKeown, Edwards & Lenahan, P.L.L.C.

[57] ABSTRACT

A valve with a Laval nozzle, a valve needle movable axially in the Laval nozzle, and an inlet chamber which receives the valve needle foot, in which chamber a radially extended inlet opening terminates. The inlet chamber is separated axially from the inlet plane of the Laval nozzle by a flow channel located therebetween. The inlet chamber is delimited by the valve needle on one side and by one of the valve needle housing sections surrounding the valve needle on the other side. This valve can be used in particular as a metering valve for metering a process gas for a reaction process in a motor vehicle operated by a fuel cell.

19 Claims, 1 Drawing Sheet

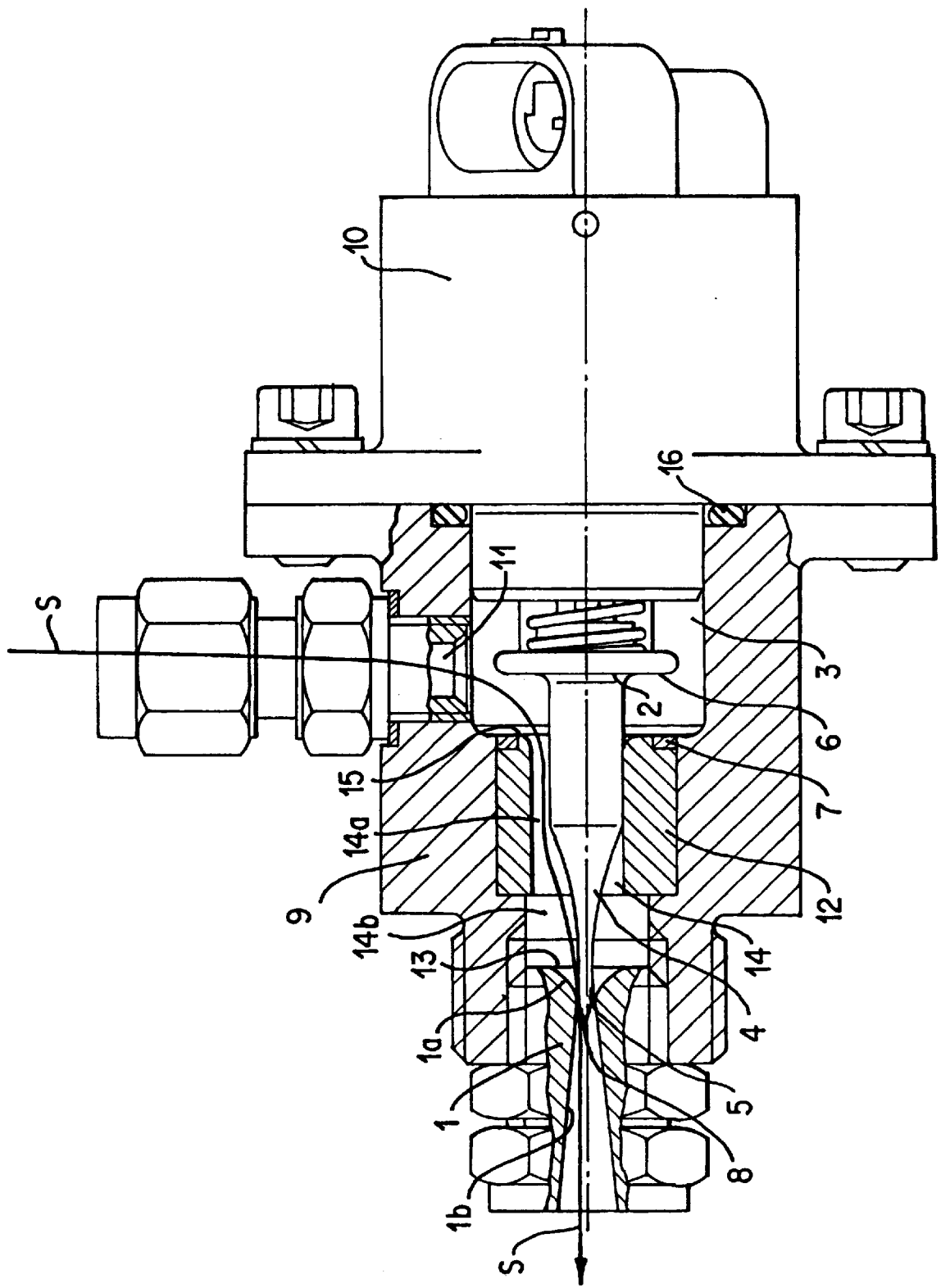

VALVE WITH A LAVAL NOZZLE AND A METHOD OF METERING A FLUID

BACKGROUND AND SUMMARY OF THE INVENTION

This application claims the priority of German patent application number 196 43 054.2, the disclosure of which is expressly incorporated by reference herein.

The invention relates to a valve containing a Laval nozzle and a valve needle axially movable in the Laval nozzle.

A valve of this general type is known from in German patent application number DE 42 33 207 A1. The valve in that document is used as a vent valve for venting evacuated chambers. The inlet chamber that receives the valve needle foot, into which chamber the air used for venting purposes flows radially, is located upstream, directly adjacent to the entry plane of the Laval nozzle. The end of the Laval nozzle that faces the inlet chamber serves as a stroke-limiting stop surface for a matching stop bead on the valve needle foot.

German patent document DE 36 26 681 A1 relates to a valve for controlling the quantity of air and/or fuel in internal combustion engines, said valve being located in a corresponding intake air manifold. The valve comprises a Laval nozzle and a closing body engaging therein, said body having a conical shape with a base surface domed skirtwise and guided axially movably on a guide tube. The nozzle inlet area is defined by the closing body outer surface domed skirtwise and by a diaphragm with a concave shape surrounding said surface at a distance therefrom, and with an inlet chamber directly abutting said diaphragm, said chamber receiving the air or fuel flow drawn in radially or axially.

A regulating valve is known from German patent document DE 34 44 039 A1, including a Laval nozzle and a valve needle axially movably engaging the Laval nozzle. The valve needle is surrounded in a central section by a tubular valve housing with a space therebetween, with guide vanes being provided in the annular gap formed thereby in order to guide and direct the gas flow passing through. On the inlet side, a supply line connects to the tubular valve housing, said line having a slightly smaller inside cross section than the tubular valve housing and being bent outward diagonally from the axial direction in a rounded arc toward the inlet opening. The foot area of the valve needle, which runs axially in a straight line, passes through a throughput opening provided in the feed tube, with a guide bushing being installed in this through opening and serving for axially movable guidance of the valve needle.

The known property of a Laval nozzle, namely that the pressure ratios on the outlet side do not influence the inlet area, is utilized in a fuel injection device in German patent document DE 41 00 086 A1 for an internal combustion engine. The Laval nozzle is located between a fuel outlet opening and a mixture outlet opening located downstream therefrom. The Laval nozzle permits good preparation of the fuel-air mixture without a high fuel injection pressure being required.

For metering process gases supplied, metering valves are known in process technology in the form of pulse-width controlled 2/2-way valves, needle valves with an adjusting device, or proportionally operating solenoid valves. For precise metering of volumes of gas into a process reactor with a fluctuating internal pressure, a costly pressure-regulating system must usually be installed in order to maintain the desired metering accuracy. In addition, in these conventional valves, a costly regulating circuit with corresponding sensorics is often required. The mass-flow devices used for this purpose theoretically exhibit a certain amount of inertia that limits the speed with which metering changes can be made.

The invention has as the technical goal to be achieved the provision of a valve of the species recited at the outset with a flow guidance that is comparatively insensitive in terms of pressure fluctuations, as well as an advantageous application for such a valve.

This and other needs have been met according to the present invention by providing a valve comprising: a Laval nozzle; a valve needle axially movable in said Laval nozzle; an inlet chamber receiving a foot of said valve needle; an inlet opening communicating with said chamber, said inlet opening extending radially, said inlet chamber being spaced axially from an inlet plane of said Laval nozzle by a flow channel located therebetween, said flow channel being delimited by said valve needle and by a valve housing section that surrounds the valve needle and guides the valve needle axially.

This and other needs have also been met according to the present invention by providing a valve comprising: a housing defining an inlet chamber and a flow channel communicating with each other; a Laval nozzle arranged in said housing and defining an axial direction, said Laval nozzle defining a convergent flow cross-section communicating with said flow channel and a divergent flow cross-section adjacent said convergent flow cross-section at a narrowest cross-section; and a valve needle supported in said housing, said valve needle having a portion with a cross-section which varies in said axial direction, said valve needle being arranged such that said portion is axially movable in said Laval nozzle in order to vary a cross-sectional area of an opening defined between said portion and said narrowest cross-section of said Laval nozzle.

This and other needs have also been met according to the present invention by providing a method of metering a fluid, comprising the steps of: forming a housing to define an inlet chamber and a flow channel communicating with each other; arranging a Laval nozzle in an axial direction in said housing such that said Laval nozzle is in communication with and is downstream of said flow channel; arranging a valve needle to be axially movably supported by said housing such that a portion of said valve needle with a cross-section which varies in said axial direction is movable in said Laval nozzle; and ontrolling an axial position of said valve needle relative to said Laval nozzle in order to vary a cross-sectional area of an opening defined between said portion of said valve needle and said Laval nozzle.

In a valve according to a preferred embodiment of the present invention, the inlet chamber in which one or more radially extending inlet openings terminate is spaced axially from the inlet plane of the Laval nozzle by a flow channel located therebetween, said channel being limited radially on the inside by the valve needle and radially on the outside by a valve housing section that surrounds the valve needle with a corresponding space therebetween. Accordingly, the deflection of the radially guided flow into the axial flow in the Laval nozzle area takes place at a distance in front of the nozzle inlet that corresponds to the length of the flow channel. The flow guided through the valve thus travels over the length of this flow channel before reaching the narrowest throughput cross section in the Laval nozzle area in the axial direction, in which direction it also passes through the Laval nozzle. As a result, in the vicinity of the narrowest throughput cross section of the Laval nozzle, the critical nozzle flow at that point (M=1) can be adjusted to remain stable without pressure fluctuations, especially those of the backpressure that prevails at the outlet side of the Laval nozzle, significantly disturbing this stable through flow.

The spacing of the flow deflection area in the valve according to the invention, in other words in the inlet chamber, from the inlet plane of the Laval nozzle also creates a situation in which flow deflection takes place in a zone in which the flow rate is still significantly less than in the inlet area of the Laval nozzle. As a result, the flow deflection losses can be kept low which in turn means that the valve can be used to provide the desired, defined flow ratios over a relatively wide usable operating range of the ratio of the backpressure to the forepressure, in other words of the pressure at the nozzle outlet to the pressure at the nozzle inlet.

A valve according to a preferred embodiment of the present invention exhibits favorable through flow properties as well as a valve needle travel limitation that is defined by stop surfaces located outside the Laval nozzle so that the Laval nozzle surfaces are not subjected to corresponding impact forces.

According to certain preferred embodiments of the present invention, a sleeve is placed in the valve housing. The sleeve serves as a guide for the axially movable valve needle guided through the sleeve and also defines one or more recesses extending axially. These recesses in this area form the corresponding portion of the flow channel located therebetween.

The valve according to certain the present invention may be used as a metering valve for metering a process gas for a reaction process in a motor vehicle operated on fuel cells. Very exact metering of the process gas in question can be accomplished with the valve, at comparatively low cost, which is of great significance for the corresponding reactions in the fuel cells themselves and/or the reactors connected upstream from the cells, for example reformation reactors for obtaining hydrogen. The valve design according to the invention therefore makes it possible in an economical fashion and without active sensorics and regulating circuits, to adjust the desired mass flow largely independently of pressure fluctuations.

The invention therefore provides an apparatus and a method which, at a constant forepressure and flow pressure, measure mass flow as a linear function of the cross-section of the opening between the narrowest cross-section of the Laval nozzle and the needle, which cross-section of the opening is adjustable by axial movement of the needle via the linear actuator to control the mass flow.

Other objects, advantages and novel features of the present invention will become apparent from the following detailed description of the invention when considered in conjunction with the accompanying drawings.

BRIEF DESCRIPTION OF THE DRAWING

The single FIGURE shows a lengthwise section through a metering valve according to a preferred embodiment of the present invention.

DETAILED DESCRIPTION OF THE DRAWING

In vehicles operated on fuel cells, the fuel cells are supplied with oxygen, among other substances, obtained for example from a methanol reformation reaction. The educt gas from the reformation reactor must be purified to remove harmful carbon monoxide in order not to damage the fuel cells downstream. This can be accomplished in known fashion by selective oxidation for example, with the atmospheric oxygen being metered precisely to the process and being added proportionally as a function of the educt flow or according to a predetermined ratio, preferably in a plurality of reactors connected in series. The individual reactors are subject to different pressure levels, so that an additional boundary condition for these mobile applications allows pressure fluctuations of up to 50% of the rated or design pressure, caused by operation. The valve shown can be used for metering atmospheric oxygen with sufficient accuracy despite these conditions without a high technical regulating cost. It also permits high adjusting speeds like those required for the process of hydrogen gas generation under the usual dynamic vehicle operating conditions.

The valve shown for this purpose has a special design that comprises a nozzle 1 in the form of a so-called Laval nozzle which has a convergent flow cross section in a portion 1a on the inlet side and a divergent flow cross section in an outlet side section 1b. The Laval nozzle is inserted into a corresponding axial receiving bore of a valve housing 9. A specially shaped valve needle 4, with a point at the front end, engages Laval nozzle 1, with its point 8 pointing in the flow direction, said needle being located axially movably in valve housing 9. The axial displacement of valve needle 4 adjusts the size of the narrowest throughput cross section 5 of the valve, said valve always being in the vicinity of nozzle 1. Foot 2 of valve needle 4 is located inside an inlet chamber 3 and is connected with a linear actuator 10, by which valve needle 4, electrically driven, can be controlled to assume the desired axial position. Inlet chamber 3 is formed by an axial bore located on the side of the cylindrical valve housing 9 facing away from the nozzle and is sealed at its end away from the nozzle by linear actuator 10 with a sealing ring 16 therebetween. An inlet opening 11 that extends radially terminates in inlet chamber 3.

Inlet chamber 3 is spaced axially away from inlet plane 13 of Laval nozzle 1 by the length of a flow channel 14 located therebetween, said channel being delimited radially inward by valve needle 4 and radially outward by a corresponding valve housing section. A section on the inlet chamber side of this flow channel 14 located therebetween is formed by a plurality of recesses 14a of which one can be seen in FIG. 1, said recesses being formed to run axially and with equidistant circumferential spacing on the inside of sleeve 12, said sleeve being inserted by a press fit into a matching axial valve housing bore. Valve needle 4 is passed through this sleeve 12 and slidably abuts its radial inner surface areas between recesses 14a by an area that is not yet tapered, so that it is guided in its axial movement by sleeve 12. Recesses 14a terminate in the flow direction in a section 14b on the nozzle side of flow channel 14 located therebetween, said section 14b being formed on the nozzle side by an additional axial bore area of valve housing 9 and having a throughput cross section that is larger than the total throughput cross section of axial recesses 14a of sleeve 12.

At its foot 2, valve needle 4 has a stop bead or flange 6 that limits the axial stroke movement of valve needle 4 in the flow direction by abutting end 15 of inserted sleeve 12 on the side facing the inlet chamber, said end being provided with an elastic sealing ring 7. Sealing ring 7 ensures complete gas tightness between inlet chamber 3 and flow channel 14 that abuts in the flow direction to create the closed valve position defined by this stop. In the open valve position, as indicated by flow arrow S, a vapor or preferably a gaseous medium can be conducted at a certain forepressure (i.e., the pressure of the medium entering the valve) in the radial direction through inlet opening 11 into inlet chamber 3. Flow S is deflected in the axial direction in inlet chamber 3 and enters section 14b of flow channel 14 located therebetween on the nozzle side through recesses 14a on the inside of inserted sleeve 12. From there, the medium flows into Laval nozzle 1 and traverses the latter, while retaining the essentially axial flow direction of that applied in flow channel 14 connected upstream.

By virtue of the special design of nozzle 1 and the area of valve needle 4 engaging the latter, a situation is created in which the mass flow of the medium traversing the valve, which depends on the value of the narrowest throughput cross section 5 of the valve and hence can be adjusted to a desired value by the axial movement of valve needle 4, can be kept essentially constant throughout a wide range of possible fluctuations in the ratio of the backpressure prevailing at the nozzle outlet to the forepressure at which the medium enters the valve. While the mass flow at the given narrowest valve throughput cross section in the case of conventional throttle positions decreases significantly with an increasing pressure ratio beginning at a pressure ratio of about 0.53 (for biatomic gases, k=1.4), in the valve shown, it remains approximately constant up to a pressure ratio of approximately 0.8.

With the valve shown, a medium in the form of a gas or a vapor can be metered comparatively precisely at low cost without a sensor being necessary in linear actuator 10 or mass flow detection being required for determining the actual value for a regulating circuit. The valve operates in the design range on the basis of the Laval flow conditions practically independently of backpressure. By using Laval nozzle 1, the forepressure can be lowered up to 30% by comparison with a conventional throttle point, so that the installed compressor work and hence the power draw are reduced accordingly. Since no differential pressure regulator is required for compensating backpressure fluctuations, a compact valve design is possible.

With a constant forepressure and constant flow pressure, the mass flow through the valve is strictly linearly dependent on the area of the narrowest throughput cross section. The constant forepressure is usually provided by an overpressure valve associated with a corresponding compressor. Additional measurement sensorics and pressure-regulating elements for controlling the mass flow can be eliminated. Since the valve needle is continuously movable axially, it undergoes only very little wear so that no degradation of metering accuracy develops. The valve can easily be designed to withstand temperatures up to 130° C., and even higher temperatures with suitable insulation of linear actuator 10. Linear actuator 10 can be controlled by electronic components or computer units conventionally provided in motor vehicles. The invention therefore provides an apparatus and a method which, at a constant forepressure and flow pressure, measure mass flow as a linear function of the cross-section of the opening between the narrowest cross-section of the Laval nozzle and the needle, which cross-section of the opening is adjustable by axial movement of the needle via the linear actuator to control the mass flow.

In addition to the above-mentioned purposes, the valve according to the invention, which is also capable of running when dry, can be used for metering any nonaggressive gases or combustion gases in chemical processing plants, such as hydrogen, nitrogen, air, methane, butane, propane, and steam for example.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A valve comprising:
   a Laval nozzle;
   a valve needle axially movable in said Laval nozzle;
   an inlet chamber receiving a foot of said valve needle;
   an inlet opening communicating with said chamber, said inlet opening extending radially,
   said inlet chamber being spaced axially from an inlet plane of said Laval nozzle by a flow channel located therebetween, said flow channel being delimited by said valve needle and by a valve housing section that surrounds the valve needle and guides the valve needle axially.

2. A valve according to claim 1, wherein said flow channel comprises a first channel located toward the nozzle and a second channel located toward the inlet chamber, said second channel having a throughput cross-section smaller than said first channel, an end of said valve housing section forming a stroke-limiting stop surface for a stop flange on said valve needle foot on the inlet chamber side.

3. A valve according to claim 2, wherein said valve housing section comprises a sleeve inserted into a valve housing bore, said second channel being defined as at least one recess defined on an interior side of said sleeve, said valve needle being guided axially movably through said sleeve.

4. A valve according to claim 1, wherein said valve is incorporated into a fuel cell system in a motor vehicle.

5. A valve comprising:
   a housing defining an inlet chamber and a flow channel communicating with each other;
   a Laval nozzle arranged in said housing and defining an axial direction, said Laval nozzle defining a convergent flow cross-section communicating with said flow channel and a divergent flow cross-section adjacent said convergent flow cross-section at a narrowest cross-section; and
   a valve needle supported in said housing, said valve needle having a portion with a cross-section which varies in said axial direction, said valve needle being arranged such that said portion is axially movable in said Laval nozzle in order to vary a cross-sectional area of an opening defined between said portion and said narrowest cross-section of said Laval nozzles,
   said inlet chamber being spaced axially from an inlet plane of said Laval nozzle by said flow channel located therebetween, said flow channel being delimited by said valve needle and by a valve housing section that surrounds the valve needle and guides the valve needle axially.

6. A valve comprising:
   a housing defining an inlet chamber and a flow channel communicating with each other;
   a Laval nozzle arranged in said housing and defining an axial direction, said Laval nozzle defining a convergent flow cross-section communicating with said flow channel and a divergent flow cross-section adjacent said convergent flow cross-section at a narrowest cross-section, said flow channel comprising a first channel located proximate the nozzle and a second channel located proximate the inlet chamber, said second channel having a throughput cross-section smaller than said first channel; and a valve needle supported in said housing, said valve needle having a portion with a cross-section which varies in said axial direction, said valve needle being arranged such that said portion is axially movable in said Laval nozzle in order to vary a cross-sectional area of an opening defined between said portion and said narrowest cross-section of said Laval nozzle.

7. A valve according to claim 6, wherein said second channel is defined between an interior side of said housing and said valve needle.

8. A valve according to claim 7, wherein said valve needle is axially movably guided on said interior side of said housing, and wherein said interior side of said housing defines at least one axial recess communicating said inlet chamber with said first channel.

9. A valve according to claim 6, wherein said housing comprises a main housing part and a sleeve supported by said main housing part, said sleeve defining said second channel.

10. A valve according to claim 8, wherein said housing comprises a main housing part and a sleeve supported by said main housing part, said sleeve defining said second channel and said at least one axial recess.

11. A valve according to claim 6, further comprising an inlet defining an inlet opening which extends radially and which communicates with said inlet chamber.

12. A valve according to claim 6, wherein said valve is incorporated into a fuel cell system in a motor vehicle.

13. A method of metering a fluid, comprising the steps of:

providing a housing defining an inlet chamber and a flow channel communicating with each other;

arranging a Laval nozzle in an axial direction in said housing such that said Laval nozzle is in communication with and is downstream of said flow channel;

arranging a valve needle to be axially movably supported by said housing such that a portion of said valve needle with a cross-section which varies in said axial direction is movable in said Laval nozzle, said inlet chamber being spaced axially from an inlet plane of said Laval nozzle by said flow channel located therebetween, said flow channel being delimited by said valve needle and by a valve housing section that surrounds the valve needle and guides the valve needle axially; and controlling an axial position of said valve needle relative to said Laval nozzle in order to vary a cross-sectional area of an opening defined between said portion of said valve needle and said Laval nozzle.

14. A method of metering a fluid, comprising the steps of:

providing a housing defining an inlet chamber and a flow channel communicating with each other;

arranging a Laval nozzle in an axial direction in said housing such that said Laval nozzle is in communication with and is downstream of said flow channel, said flow channel comprising a first channel located proximate the nozzle and a second channel located proximate the inlet chamber, said second channel having a throughput cross-section smaller than said first channel;

arranging a valve needle to be axially movably supported by said housing such that a portion of said valve needle with a cross-section which varies in said axial direction is movable in said Laval nozzle; and controlling an axial Position of said valve needle relative to said Laval nozzle in order to vary a cross-sectional area of an opening defined between said portion of said valve needle and said Laval nozzle.

15. A method according to claim 14, wherein said second channel defines at least one axial recess communicating said inlet chamber with said first channel.

16. A method according to claim 14, wherein said housing is formed by inserting a sleeve into an axial bore in a main housing part, said sleeve defining said second channel.

17. A method according to claim 15, wherein said housing is formed by inserting a sleeve into an axial bore in a main housing part, said sleeve defining said second channel and said at least one axial recess.

18. A method of metering a fluid, comprising the steps of:

providing a housing defining an inlet chamber and a flow channel communicating with each other;

arranging a Laval nozzle in an axial direction in said housing such that said Laval nozzle is in communication with and is downstream of said flow channel;

arranging a valve needle to be axially movably supported by said housing such that a portion of said valve needle with a cross-section which varies in said axial direction is movable in said Laval nozzle;

controlling an axial position of said valve needle relative to said Laval nozzle in order to vary a cross-sectional area of an opening defined between said portion of said valve needle and said Laval nozzle; and mounting an inlet on said housing, said inlet defining an inlet opening which extends radially, said inlet being arranged such that said inlet opening extends radially and communicates with said inlet chamber.

19. A method according to claim 14, further comprising using said valve to meter a process gas for a reaction process in a motor vehicle operated by a fuel cell.

* * * * *